United States Patent [19]

Kato et al.

[11] 4,194,417
[45] Mar. 25, 1980

[54] APPARATUS FOR IMPROVING FUEL ECONOMY OF MULTI-CYLINDER I. C. ENGINE FOLLOWED BY AUTOMATIC TRANSMISSION VIA HYDROKINETIC UNIT

[75] Inventors: Fumiaki Kato, Yokohama; Haruhiko Itzuka, Yokosuka; Fukashi Sugasawa, Yokohama; Junichiro Matsumoto, Yokosuka, all of Japan

[73] Assignee: Nissan Motor Company, Limited, Yokohama, Japan

[21] Appl. No.: 945,877

[22] Filed: Sep. 26, 1978

[30] Foreign Application Priority Data

Oct. 12, 1977 [JP] Japan .................................. 52-121416

[51] Int. Cl.$^2$ ............................................. B60K 41/04
[52] U.S. Cl. .................................. 74/866; 123/32 EA
[58] Field of Search ........................ 74/859, 860, 866; 123/198 F, 32 EA

[56] References Cited

U.S. PATENT DOCUMENTS

| | | | |
|---|---|---|---|
| 3,578,116 | 5/1971 | Nakajima et al. | 123/198 F X |
| 4,008,567 | 2/1977 | Hirsch | 74/866 X |
| 4,061,055 | 12/1977 | Iizuka et al. | 74/859 X |
| 4,144,863 | 3/1979 | Abdoo | 74/860 X |

*Primary Examiner*—G. J. Husar
*Assistant Examiner*—Frank McKenzie
*Attorney, Agent, or Firm*—Lowe, King, Price & Becker

[57] ABSTRACT

Fuel economy of a multi-cylinder internal combustion engine has been improved by allowing, when a vehicle is at a standstill, the engine to run on selected cylinders of all. The idling operation of the engine on the selected cylinders has been made smooth by the provision of a switch valve in a control circuit of the transmission. With the switch valve, as soon as an accelerator pedal is released when the vehicle is at a standstill, hydraulic fluid will be drained from the control circuit to render a gearing of the transmission in a neutral condition even if a manually selector valve in the control circuit is held in a drive range position. This prevents transmission of load to the engine through the hydrokinetic unit which otherwise would occur when the manually selector valve is in the drive range position.

2 Claims, 5 Drawing Figures

APPARATUS FOR IMPROVING FUEL ECONOMY OF MULTI-CYLINDER I. C. ENGINE FOLLOWED BY AUTOMATIC TRANSMISSION VIA HYDROKINETIC UNIT

BACKGROUND OF THE INVENTION

The present invention relates to means for improving fuel economy of a multi-cylinder internal combustion engine followed by an automatic transmission through a hydrokinetic unit.

It is known, for the purpose of improving fuel economy, to operate a multi-cylinder internal combustion engine on selected cylinders of all under light load.

In the case of a multi-cylinder internal combustion engine followed by an automatic transmission via a hydrokinetic unit, such as a torque converter or a hydraulic coupling, if the engine runs on selected cylinders of all, the engine is likely to halt when the vehicle is brought to a standstill with a selector lever of a selector valve in a "drive" range. This is because, under this condition, the engine revolution speed is low and a certain load is imposed on the engine via the hydrokinetic unit. It therefore is the conventional practice to operate the engine on all of the cylinders to assure vibration free smooth engine operation at idling speed. The fact that, when the engine idles, all of the cylinders are brought into operation is not favourable from the point of view of cutting off fuel consumption.

A conventional apparatus or cylinder selector for operating a 6-cylinder internal combustion engine on selected three cylinders of all is shown in FIG. 2 and FIG. 1 shows a diagram explaining operation modes of the engine provided with the apparatus shown in FIG. 2. In this diagram, the pulse width $W_p$ of a fuel injection signal is against the engine revolution speed(RPM) $N_E$.

The operation modes are as follows:

(1) The engine runs on 6 cylinders when the engine speed $N_E$ is lower than a predetermined level or value $N_{EO}$ because at such low engine speeds the engine might vibrate if it runs on 3 cylinders.

(2) When the engine speed $N_E$ is higher than the predetermined level $N_{EO}$, the number of cylinders on which the engine run is controlled as follows by comparing the actual pulse width of fuel injection signal $W_p$ with two predetermined levels $W_{PH}$ and $W_{PL}(W_{PH} > W_{PL})$.

(a) The engine runs on 6 cylinders (6-cylinder mode) when $W_p$ is greater than the higher predetermined level $W_{PH}$.

(b) The engine runs on 3 cylinders when the pulse width $W_P$ is smaller than the lower predetermined level $W_{PL}$.

(c) When the pulse width $W_P$ plunges into the intermediate range between the higher and lower predetermined levels $W_{PH}$ and $W_{PL}$ from the range above or greater than the higher predetermined level $W_{PH}$, the engine continues to run on 6 cylinders until the pulse width $W_p$ becomes smaller than the lower predetermined level $W_{PL}$. When the pulse witdh $W_p$ plunges into the intermediate range between the higher and lower predetermined levels $W_{PH}$ and $W_{PL}$ from the range below or smaller than the lower predetermined level $W_{PL}$, the engine continues to run on 3 cylinders until the pulse width $W_p$ becomes greater than the higher predetermined level $W_{PH}$.

Explaining the apparatus of FIG. 2, an engine intake air flow sensor 1 and an engine revolution sensor 2 are provided to produce outputs representing the intake air flow, in quantity, and representing the engine revolution speed(RPM), respectively. These outputs from the sensors 1 and 2 are fed to a fuel injection control unit 3 which produces a fuel injection signal whose pulse width representing the engine load of the engine under the control. Comparators 4, 5 and 6 are provided together with two pulse width level adjusters 7 and 8 and an engine revolution speed level adjuster 9. The comparator 4 compares the pulse width signal $W_p$ with a high predetermined pulse width level signal $W_{PH}$ and produces a high level signal "1" only when $W_p$ is greater than $W_{ph}(W_p > W_{PH})$, while, the second comparator 5 compares the signal $W_P$ with a low predetermined pulse width signal $W_{PL}$ and produces a high level signal "1" when $W_P$ is greater than $W_{PL}$ ($W_P > W_{PL}$). The comparator 6 determines the engine revolution speed from the frequency of pulses of the fuel injection signal from the fuel injection control unit 3 and compares the engine revolution speed signal $N_E$ with a predetermined engine revolution speed level $N_{EO}$ to produce a high level signal "1" when $N_E$ is greater than $N_{EO}(N_E > N_{EO})$. The outputs from these comparators remain at a low level signal "0" outside of the predetermined conditions as above. An OR circuit 10 and an AND circuit 11 are provided. The output from the comparator 4 is fed to one of two inputs of the OR circuit 10 and the output from the comparator 6 is fed to the other input of the OR circuit 10 through an inverter 13. The output from the comparator 6 is fed to one of two inputs of the AND circuit 11 and the output from the comparator 5 is fed to the other input of the AND circuit 11 through an inverter 12.

The output of the OR circuit 10 is fed to "S" (set) terminal of a flip-flop circuit 14 and the output of the AND circuit 11 is fed to "R" (preset) terminal thereof. When $W_P > W_{PH}$ and/or $N_E > N_{EO}$, a high level signal "1" appears as the output from the OR circuit 10 and a low level signal "0" appears outside this condition. Meanwhile, a high level signal "1" appears as the output from the AND circuit 11 when $W_P > W_{PL}$ and $N_E > N_{EO}$ and a low level signal "0" appears outside this condition. The flip-flop circuit 14 produces at its Q output terminal a high level signal "1" when the engine operating condition is within a 6-cylinder region diagrammatically illustrated in FIG. 1 and continues to produce the high level signal "1" until the engine operating condition falls into 3-cylinder region shown in FIG. 1. When the engine operating condition has fallen into 3-cylinder mode, the output on the Q terminal switches to a low level signal "0" and this low level signal "0" will be maintained until the engine operating condition falls into the 6-cylinder mode range shown in FIG. 1. The Q output is fed to one of two input terminals of an AND circuit 15 whose the other input terminal receives the fuel injection signal from the fuel injection control unit 3. When a high level signal "1" appears on the Q output terminal of the flip-flop circuit 14, the AND circuit 15 will permit the passage of the fuel injection signal therethrough toward a terminal 16 operatively connected with fuel injection nozzles adapted to supply fuel to cylinders #1 to #3 so that under this condition the fuel injection nozzles for these cylinders inject fuel in response to fuel injection signal from the fuel injection control unit 3. Since the fuel injection signal is always supplied via terminal 17 to three fuel injection nozzles for the other three cylinders #4 to #6, the engine operates on 6 cylinders under this condition. When the signal on the Q output terminal of the flip-flop circuit 14 switches to a low level signal "0", the AND gate 15 is closed to prevent the passage of fuel injection signal therethrough toward the terminal 16 so that fuel injection to cylinders #1 to #3 will be suspended. Thus, under this condition, the engine runs on 3 cylinders #4 to #6.

SUMMARY OF THE INVENTION

It is an object of the present invention to improve fuel economy of a multi-cylinder internal combustion engine followed by an automatic transmission via a hydrokinetic unit by allowing the engine to run on selected cylinders of all at idling.

According to the present invention, a solenoid operable switch valve is provided to drain hydraulic fluid from a hydraulic control circuit of an automatic transmission to shift a gearing thereof into a neutral condition regardless of selected position of a manually operable selector valve. A plurality of sensors are provided which include a vehicle speed sensor for detecting that a vehicle is at a standstill, a load sensor for detecting the load applied to the engine is below a predetermined level, a selector valve condition sensor for detecting that the selector valve is in a position corresponding to the neutral condition of the gearing, and a switch valve condition sensor for detecting that the switch valve has been actuated. When actuated, the switch valve will drain hydraulic fluid from the hydraulic control circuit. The actuation will be effected upon energization of a solenoid of the switch valve. A logic circuit is provided which produces a signal when the vehicle speed sensor detects that the vehicle is at a standstill and the load sensor detected that the engine load is below the predetermined level. This signal is fed to the solenoid to energize the same so as to actuate the switch valve. This logic circuit will produce a second signal when the selector valve condition sensor detects that the selector valve is in the corresponding position to the neutral condition of the gearing or when the switch valve condition sensor detects that the switch valve has been actuated. The engine is allowed to run on selected cylinders of all as long as this second signal appears.

DESCRIPTION OF THE PREFERRED EMBODIMENT

Figure 3:
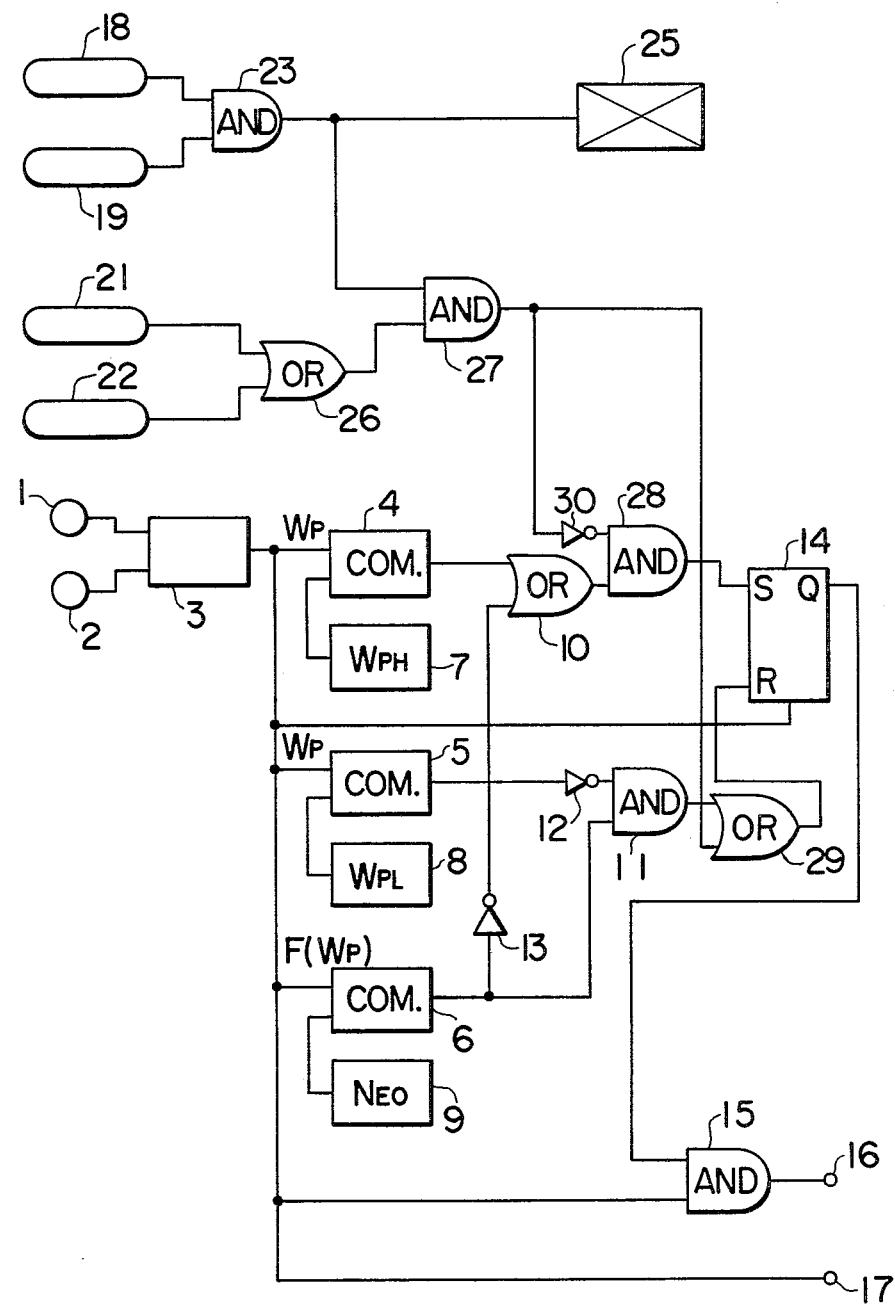
FIG. 3 is a circuit diagram showing a portion of preferred embodiment according to the present invention.
Figure 4:
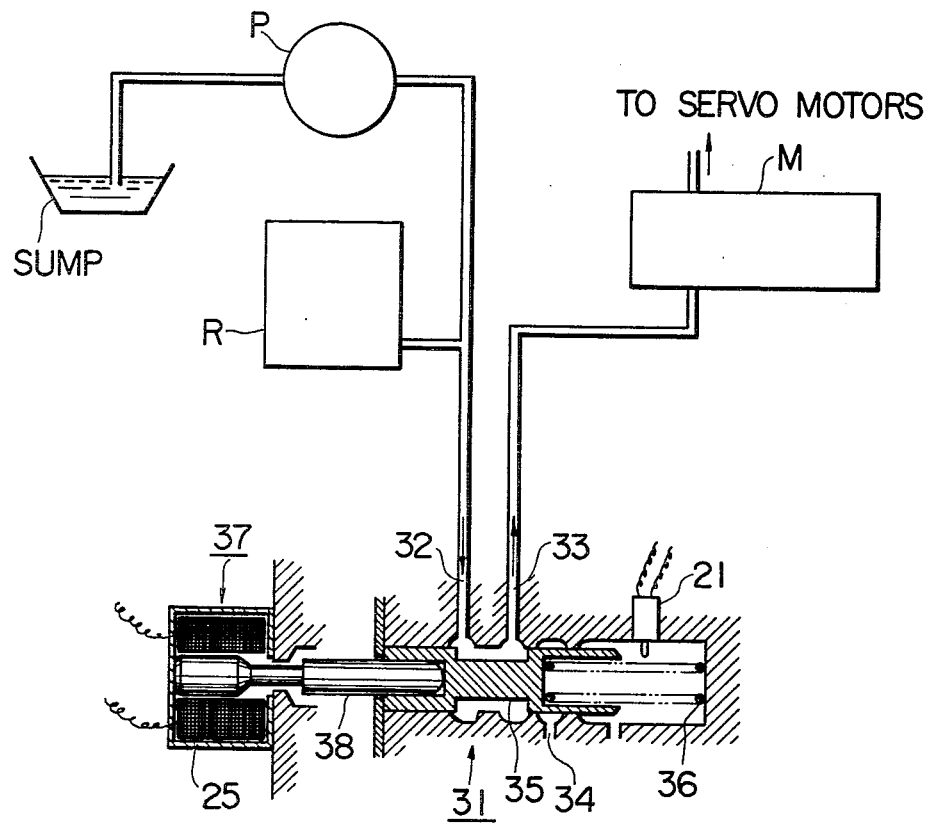
FIG. 4 is a schematic diagram, partly shown in section, showing the remaining portion of the preferred embodiment according to the present invention.
Figure 5:
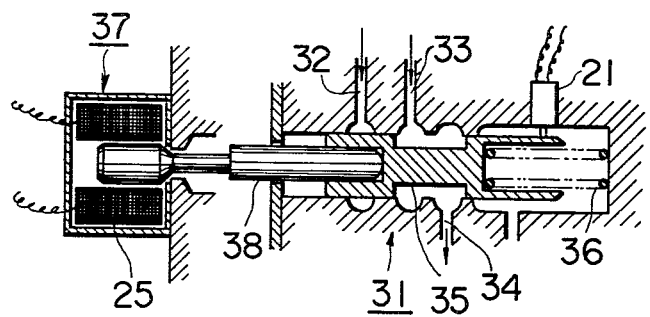
FIG. 5 is a fragmentary view of FIG. 4 showing a condition of a switch valve upon energization of a solenoid.

Referring to FIGS. 3 through 5, the preferred embodiment according to the invention will be described.

Figure 1:
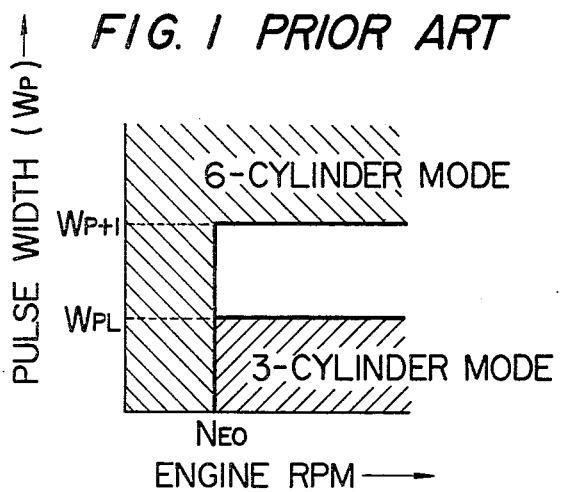
FIG. 1 is a diagram explaining operation modes of a 6-cylinder internal combustion engine provided with an apparatus shown in FIG. 2.
Figure 2:
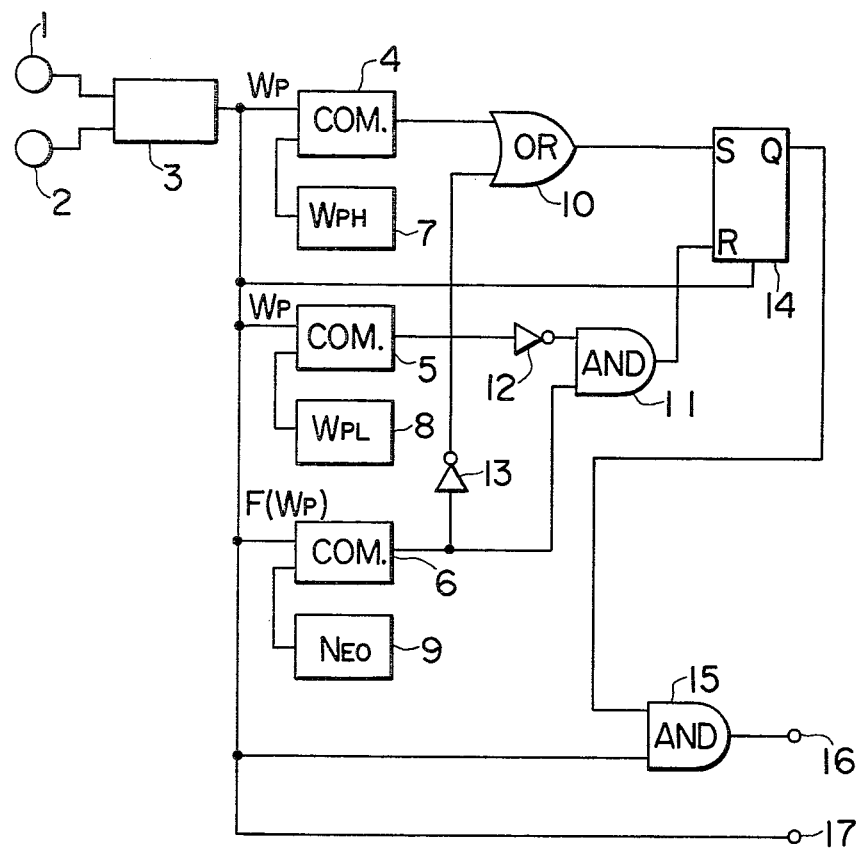
FIG. 2 is a circuit diagram of the conventional apparatus for operating the 6-cylinder internal combustion engine on selected three cylinders of all, the apparatus having been described beforehand.

In these Figures the same reference numerals as used in FIG. 2 are used to designate similar parts. The circuit diagram of the embodiment shown in FIG. 3 differs from that shown in FIG. 2 in that, in the preferred embodiment of the invention, there are additionarlly provided a vehicle speed sensor, such as a vehicle speed responsive switch 18 which will produce a high level signal "1" when it detects that the vehicle is at a standstill or the vehicle speed is zero; a load sensor, such as an accelerator responsive switch 19 which will produce a high level signal "1" when it detects that the accelerator pedal is released or a throttle valve responsive switch which will produce a high level signal "1" when it detects that the throttle valve is in a closed position; a switch valve condition sensor, such as a switch 21 which will be described hereinafter, and a manually operable selector valve condition sensor, such as a selector valve condition responsive switch 22 which will produce a high level signal "1" when it detects that the manually operable selector valve is in a neutral position or a parking position. The output terminals of the switches 18 and 19 are connected to input terminals of an AND circuit 23, respectively, whose output terminal is connected to a solenoid 25 which will be described hereinafter. The output terminals of the switches 21 and 22 are connected to input terminals of an OR circuit 26, respectively, whose output terminal is connected to one of input terminals of an AND circuit 27. To the remaining input terminal of the AND circuit 27 the output terminal of the AND circuit 23 is connected.

There are also provided an AND circuit 28 and an OR circuit 29. To one of inputs of the AND circuit 28 The output terminal of the AND circuit 27 is connected to one of input terminals of the AND circuit 28 via an inverter 30. To the remaining input terminals of the AND circuit 28 the output terminal of the OR circuit 10 is connected. To one of input terminals of the OR circuit 29 the output terminal of the AND circuit 11 is connected. To the other input terminal of the AND circuit 28 and to the other input terminal of the OR circuit 29 the output terminal of the AND circuit 27 is connected. The output terminal of the AND circuit 28 is connected to the set input terminal S of the flip-flop circuit 14, while the output terminal of the OR circuit 29 is connected to the reset terminal R of the flip-flop circuit 14.

Referring to FIG. 4, a switch valve 31 is fluidly disposed in a line pressure supplying fluid line leading from an oil pump P to a manually operable selector valve M. Designated by R is an oil pressure regulating valve. The switch valve 31 has a port 32 connected to the oil pump P and the regulating valve R, a port 33 connected to an inlet port of the manually operable selector valve M and a drain port 34 connected to an oil sump. The switch valve 31 has a spool 35 with two axially spaced lands. The spool 35 is slidably disposed in a bore with which the ports 32, 33 and 34 are in communication. A spring 36 is mounted within the bore to bias the spool 34 to the left, viewing in FIGS. 4 and 5. An actuator 37 has a plunger 38 operatively engaging the spool 35 and the solenoid 25 mentioned before. When the solenoid 25 is not energized, the spool 35 will take a position as illustrated in FIG. 4 under the bias of the spring 36, in which position communication between the ports 32 and 33 is established and communication between the port 33 and the drain port 34 is cut off. Energizing the solenoid 25 will cause the plunger 38 to project outwardly from the actuator 37 to move the spool 35, aginst the bias of the spring 36, toward a position illustrated in FIG. 5. When the spool 35 takes the position of FIG. 5, the communication between the spool 35 takes the position of FIG. 5, the communication between the port 33 and the port 32 is cut off and the communication between the port 33 and the drain port is established.

The switch valve 31 is provided with the switch 21 mentioned before. The switch 21, which is provided to detect that the switch valve 31 has been actuated, is mounted to a housing defining the bore with an actuator pin thereof projecting into the bore. The actuator pin of the switch 21 is out of engagement of the spool 35 wjen the switch valve 31 is not actuated, that is, when the spool 35 is in the position of FIG. 4. When the switch valve 31 has been actuated, the spool 35 will depress the actuator pin of the switch 21 as it has moved to the position of FIG. 5. The switch 21 is so designed that it produces a high level signal "1" when its actuator pin is depressed as shown in FIG. 5.

The operation will be described hereinafter.

At idling when the vehicle is at a standstill in which the accelerator pedal is released, the switches 18 and 19 will produce high level signals "1", respectively, in response to the condition when the vehicle speed is zero and the condition when the accelerator pedal is released (or, in the case of throttle switch, the condition when the throttle valve is closed), respectively, and thus the AND circuit 23 will produce a high level signal "1". Under this condition, when the transmission is in parking condition or in neutral condition, the switch 22 will detect this condition to produce a high level signal "1". This signal is fed to one input terminal of the pair of the OR circuit 26 to make it to produce a high level signal "1". This high level signal "1" from the OR circuit 26 and the high level signal "1" from the AND circuit 23 are fed to the input terminals of the AND circuit 27 and then the AND circuit 27 will produce a high level signal "1". The high level signal "1" from the AND circuit 27 is fed to the OR circuit 29 and fed to the AND circuit 28 through the inverter 30 in which it is inverted to a low level signal "0". Therefore, the OR circuit 29 will produce a high level signal "1" regardless of the output signal condition from the AND circuit 11 and the AND circuit 28 will produce a low level signal "0" regardless of the output signal condition from the OR circuit 10 under this condition. Then, the flip-flop circuit 14 will produce a low level signal "0" since the high level signal "1" from the OR circuit 29 is fed to the reset input terminal R, while, the low level signal "0" from the AND circuit 28 is fed to the set terminal S. Since at the Q terminal of the flip-flop circuit 14 the low level signal "0" appears and fed to one input terminal of the pair of the AND circuit 15, fuel injection signals from the terminal 16 cease and thus fuel injection to three cylinders #1-#3 will be cut off under the condition when the engine is idling while the vehicle is at a standstill with the transmission conditioned in parking or neutral condition so as not to apply load on the engine. It will now be understood that the engine will be run at selected cylinders of all under this condition, thus contributing much to fuel economy.

Nextly, at idling when the vehicle is at a standstill with the accelerator pedal released and with the transmission conditioned in a drive range in which load is applied to the engine through the hydrokinetic unit, the switch 22 will produce a low level signal "0", while, the switches 18 and 19 will produce high level signals "1", respectively. Thus, under this condition, the AND circuit will produce a high level signal "1" and then the solenoid 25 will be energized upon receiving the high level signal "1" from the AND circuit 25.

The energization of the solenoid 25 will cause the plunger 38 of the actuator 37 to move the spool 35, against the spring 36, from FIG. 4 position to FIG. 5 position. This movement of the spool 35 will drain oil from a control circuit of the transmission because the port 33 communicates with the drain port when the swtich valve 31 is in a condition shown in FIG. 5. Thus, under this condition, the fluid control circuit and a gearing of the transmission will be rendered neutral. As a result, the load applied to the engine through the hydrokinetic unit will be reduced. This movement of the spool 35 will depress the actuator pin of the switch 22 to cause it to produce a high level signal "1" and this high level signal "1" is fed to one input terminal of the pair of the OR circuit 27. Then, the OR circuit 26 and the AND circuit 23 are fed to the pair of input terminals of the AND circuit 27, the AND circuit 27 will produce a high level signal "1". Thus, under this condition, as having been described, the low level signal "0" appears at the Q terminal of the flip-flop circuit 14, allowing the engine to run on three cylinders.

When it is desired to start the vehicle from this condition, the accelerator will be depressed to cause the switch 19 to produce a low level signal "0". Then, in response to this change in signal condition from "1" to "0" at the output of the switch 19, the output from the AND circuit 23 will be shifted into a low level signal "0". Thus, the solenoid 25 will be deenergized to permit the switching valve 31 to take FIG. 4 condition again from FIG. 5 condition, thus permitting the line pressure to reach through the selector valve M to respective the control unit of the transmission.

Although in the previously described embodiment the switching valve is disposed between an oil pump and a manually selector valve M. The same can be disposed in a fluid line connecting the selector valve M and the control unit, if desired.

It will now be recognized from the preceding description that since according to the invention it is possible to run an engine on part cylinders of all even without fear of engine stall and smoothly when the engine is idling because no load is imposed to the engine at adling of the engine as the transmission is conditioned not only in neutral or parking position but also in drive range position, so that considrable amount of fuel as compared to the prior art can be saved.

What is claimed is:

1. In a vehicle comprising a multi-cylinder internal combustion engine which is provided with means for operating the engine on selected cylinders of all, and an automatic transmission connected to the engine via a hydrokinetic unit to be driven by the engine through the hydrokinetic unit, the automatic transmission including a hydraulic control circuit having a source of hydraulic pressure, a sump, a control unit, each for operating a friction element and a manually operable selector valve having an inlet port connected to the source of hydraulic pressure, a drain port connected to said sump and an outlet port connectable to said control unit the manually operable selector valve having a first position in which communication between the outlet port and the inlet port is cut off and communication between the outlet port and the drain port is established and having a second position in which the communication between the outlet port and the inlet port is established and the communication between the outlet port and the drain port is cut off:

switch valve means disposed in said fluid line means and having a drain port connected to said sump, said switch valve means being operative to permit communication between said manually operable selector valve and said drain port thereof when actuated;

solenoid means for actuating said switching valve means when energized;

vehicle speed sensing means for detecting that said vehicle is at a standstill;

load sensing means for detecting that load applied to said engine is below a predetermined level;

selector valve condition sensing means for detecting that said selector valve means is in the first position thereof;

switch valve condition sensing means for detecting that said switch valve means has been actuated;

means for producing a signal supplied to said solenoid means to energize the same when said vehicle speed sensing means detects that said vehicle is at a standstill and said load sensing means detects that load applied to said engine is below the predetermined level;

means for producing a second signal when said selector valve condition sensing means detects that said selector valve means is in the first position thereof or when said switch valve condition sensing means detects that said switch valve means has been actuated; and means for causing said engine operating means to permit said engine to operate on the selected cylinders of all in response to said signals.

2. The combination as claimed in claim 1, in which said switch valve means is disposed intermediate said manually operable selector valve means at the inlet port thereof and said source of hydraulic pressure.

* * * * *